United States Patent [19]

Utasi

[11] 4,162,473

[45] Jul. 24, 1979

[54] DRILLING MUD LEVEL MEASUREMENT

[75] Inventor: Joseph G. Utasi, Katy, Tex.

[73] Assignee: Dresser Industries, Inc., Dallas, Tex.

[21] Appl. No.: 877,437

[22] Filed: Feb. 13, 1978

[51] Int. Cl.² ..................... G01S 9/68; G01F 23/00
[52] U.S. Cl. ............................. 340/1 L; 73/290 V;
    73/292; 73/349; 175/40
[58] Field of Search ............... 73/290 V, 292, 349;
    310/346, 347, 348, 349, 341, 342; 340/1 L, 8
    FT, 8 S, 15; 166/64; 175/40, 41

[56] References Cited

U.S. PATENT DOCUMENTS

| 2,900,821 | 8/1959 | Rich | 73/349 |
| 3,608,653 | 9/1971 | Rehm | 175/25 |
| 4,000,650 | 1/1977 | Snyder | 73/290 V |

OTHER PUBLICATIONS

Young et al., *Pollution Engineering*, Jul. 1975, pp. 18–25.
*Ultrasonic Level Measurement Automated Material Handling*, Wesmar Industrial Systems Div.

*Primary Examiner*—Richard A. Farley
*Attorney, Agent, or Firm*—Eddie E. Scott

[57] ABSTRACT

An accurate measurement of the level of drilling mud in a mud pit is provided using an ultrasonic transducer that includes ambient temperature correction. A cylindrical metal shroud open at the bottom is positioned around the transducer. A series of vent holes are located along the upper area of the shroud to allow the convection of ambient air. A series of Nylon screws extend through the shroud close to the transducer to limit lateral movement of the transducer within the shroud. As the shroud and transducer become heated by sunlight, ambient air is circulated from the surface of the drilling mud upward to the transducer through the space between the transducer and the sidewalls of the shroud and out through the vent holes. The chimney effect thus produced insures that the temperature correction accurately represents the temperature of the ambient air between the drilling mud and transducer.

6 Claims, 3 Drawing Figures

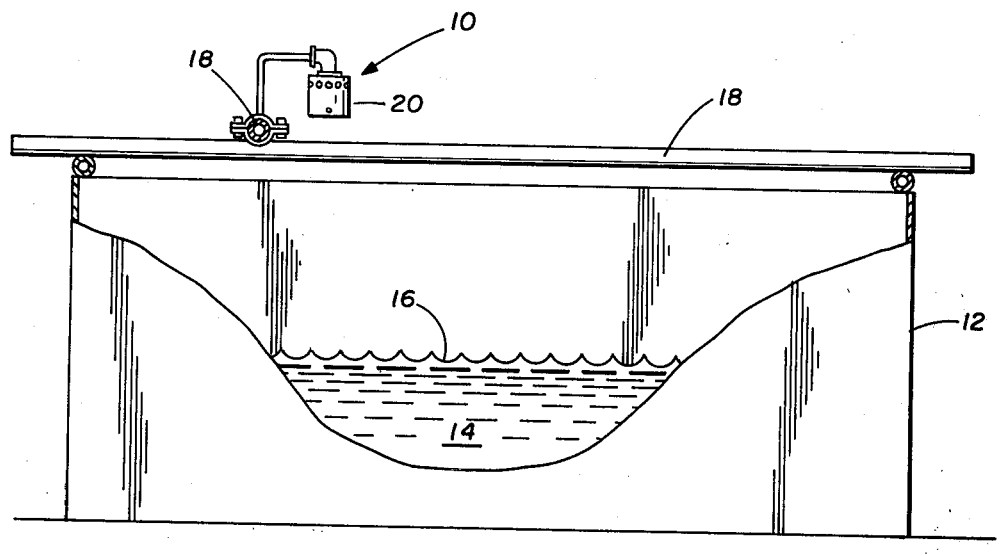
FIG. 1
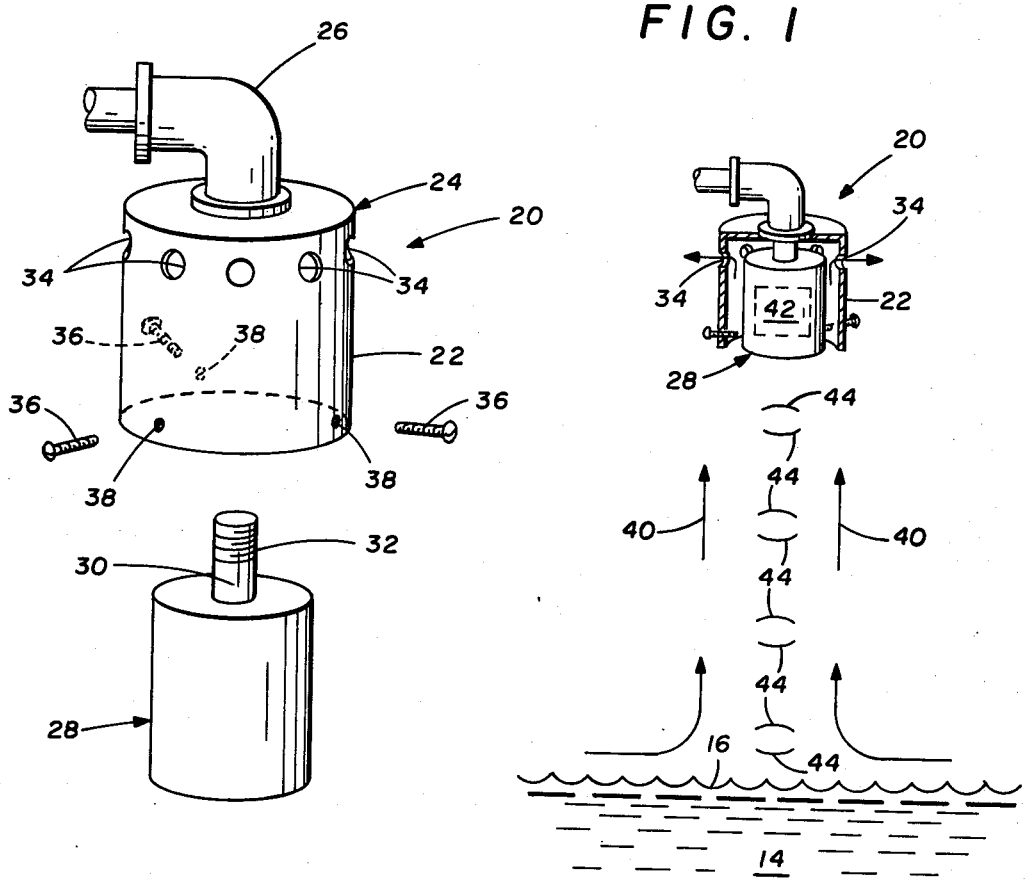
FIG. 2
FIG. 3

DRILLING MUD LEVEL MEASUREMENT

BACKGROUND OF THE INVENTION

The present invention relates in general to the art of drilling for oil and gas and more particularly to an improved apparatus for measuring the level of drilling mud in a mud pit.

During the drilling of an oil or gas well, it is important to constantly measure the level of the drilling mud in the mud pits. For example, a change in the volume of mud in the mud pits provides an indication of a potential blowout. In drilling an oil or gas well, high pressure gas from an underground reservoir may enter the wellbore. The entry of the gas is controlled by the pressure exerted by the drilling mud. The intrusion of gas is manifested by the forcing of an equivalent amount of drilling mud out of the wellbore and into the mud pits. The removal of mud from the wellbore decreases the pressure opposite the underground reservoir and allows more gas to enter the wellbore. A blowout can occur when the gas blows a substantial portion of the remaining mud out of the wellbore and the gas itself appears at the surface. Fire and accompanying loss of life and property often results from the uncontrolled blowing of gas at the surface. On the other hand if too much pressure is exerted upon the wellbore while attempting to control the gas, fracturing of the protective casing in the wellbore or the earth formations surrounding the wellbore can occur and the gas will then escape in an uncontrolled manner into the earth formations. This may manifest itself by the gas blowing in an uncontrolled manner around the drilling rig once it has worked its way to the surface. In either case, there is an economic loss including the loss of potential fuel. An accurate and continuous measurement of the level of drilling mud in the mud pits can be used to detect and take action to prevent potential blowouts. This is set out in greater detail in U.S. Pat. No. 3,608,653 to William A. Rehm, patented Sept. 28, 1971.

DESCRIPTION OF PRIOR ART

In U.S. Pat. No. 3,608,653 to William A. Rehm, patented Sept. 28, 1971, a method and apparatus for controlling a well is shown. The system controls the well to prevent a blowout and an accompanying loss of the drilling mud. The change in volume of the drilling mud in the mud pits is utilized. This change in volume is converted to a corresponding pressure change necessary to compensate for the volume change in the relationship of the gas and drilling mud in the wellbore to make such compensations as is necessary to maintain the pressure constant at the bottom of the wellbore.

The measurement of the level of the drilling mud in the mud pits has traditionally been accomplished using a float system. This has usually consisted of a horizontal arm with a float attached to the end of the arm with the float being moved up and down as the level of drilling mud increases and decreases. The other end of the arm is connected to a system for measuring the mud level. This system has numerous disadvantages. The arm is generally long and takes up a large amount of space in the mud pit. The system must have full freedom of travel from a condition wherein the mud pit is full to the condition wherein the mud pit is empty. Any pipes or other equipment mounted on the mud pit interferes with the operation of this system. Should the float become hung-up on any such equipment, accurate measurement of the mud level stops resulting in continued operation under conditions wherein there is no monitoring for potential blowout. There is increasingly a demand for space on the mud pits because of more and complex modern drilling equipment and the horizontal arm float system is losing favor.

Vertical float systems are also used for measuring drilling mud level in the mud pits. The vertical float generally consist of a ring float positioned around a vertical rod. The rod extends into the mud pit. Movement of the ring float is monitored to measure the mud level. This system has inherent disadvantages in that the nature of the drilling mud is such that it tends to stick to the float and the vertical rod causing the float to hangup resulting in conditions wherein the mud level is no longer being measured and the drilling operation is conducted under conditions wherein there is no monitoring for potential blowout.

Other types of liquid level measurement and control systems are known. The article "Liquid Level Control Devices" by R. A. Young, N. P. Cheremisinoff and E. J. Turek in *Pollution Engineer*, July, 1975, pages 18–25, describes some of the different systems. Ultrasonic systems for measuring the level of numerous types of material are known. For example, Wesmar Industrial Systems Division, 905 Dexter Avenue North, Seattle, Wash. and Endress and Hauser, Inc., 2350 Endress Place, Greenwood, Ind. market ultrasonic level measurement and level control equipment. Such systems are designed to measure the level of material stored in a remote location. The systems utilize sonic energy to perform their task. A high energy electrical pulse is sent to a sensor which converts it to an acoustical signal. The sound waves are directed to a very narrow beam toward the material. The sound waves are reflected back to the sensor, which converts this energy into an electrical impulse. The return signal is analyzed and a voltage is generated which is proportional to the distance between the sensor and the material. The voltage (or current) is then directed to a display meter, counter, recorder, etc. Temperature compensation is provided which automatically compensates for variations in the speed of sound due to temperature changes. It is possible to measure the level of liquids with this equipment. The interface between air and the liquid surface is well defined and, therefore, is a good target for the ultrasonic measurement. In situations where the liquid is agitated, the level monitor will receive echos from the trough and crest of the wave and the average of these two extremes is indicated.

The general disadvantages of sonic type level measurement equipment when it is being considered for the measurement of the level of drilling mud in the mud pits is, in general, that it cannot meet field and environment conditions and that it is too elaborate and complex to be compatible with oil field personnel. The systems that include temperature sensing elements as an integral part of the system are generally unsuitable for outdoor or exposed applications because direct exposure to the sun can cause false high temperature readings resulting in erroneous data. The sonic level measurement systems are also susceptible to inaccurate readings as a result of weather conditions such as snow, hail, sleet, etc.

In U.S. Pat. No. 3,740,739 to Phil H. Griffin, III and Martin J. Sharki, patented June 19, 1973, a well monitoring and warning system is shown. At least two process parameters are monitored and distinctive warnings are provided when each of the parameters varies beyond the desired limit. A separate and distinct warning is provided when two or more of the parameters vary beyond desired limits at the same time.

In U.S. Pat. No. 3,833,076 to Phil H. Griffin, III, patented Sept. 3, 1974, a system for the automatic filling of earth boreholes with drilling fluid is shown. A drilling fluid tank has a float ball therein connected to one end of a flexible cable having a weight on its other end for contacting a pair of electrical switches in response to the movement of the float ball. The cable has a plurality of spaced triggers for contacting a third switch providing electrical signals indicative of the incremental volumetric flow of mud from the tank into the wellbore. Two pairs of solenoid actuated valves are responsive to the position of the float ball. A deadline sensor is indicative of hookload. A paddle sensor is located in the drilling fluid return line from the wellbore. The system automatically controls the filling of the tank, the emptying of the tank and the amount of drilling fluid that is allowed to pass into the earth borehole. Electrical circuitry is also provided which measures the amount of fluid passing into the borehole and compares the measured amounts with preselected values and which causes alarms to be activated in the event that the actual fluid volume passing into the wellbore falls outside the predetermined values.

U.S. Pat. No. 3,541,852 to J. H. Brown et al., patented Nov. 24, 1970, shows an electronic system for monitoring drilling conditions related to oil and gas wells. An electronic system self-contained within a skid or trailer-mounted console provides a completely new set of well statistics once each minute or once each foot, thus giving the drilling operator a continuous picture of drilling conditions. Information recorded by the system includes drilling depth, time penetration rate, hookload, rotary speed, pump strokes, gas chromatography, and such drilling mud information as weight-in, weight-out, viscosity and temperature and flow rates. A drilling mud pit volume totalizer sub-system includes means for monitoring the mud volume to each of a series of drilling mud pits, means for adding the individual volumes to monitor the total mud volume in the system and also means to include the residual drilling mud located beneath the mud level sensors within the total mud volume. Also included within the system is mechanical apparatus and associated electronics for monitoring the true depth and rate of penetration of the drill bit and associated drill pipe and also the speed of rotation of the drill bit.

In U.S. Pat. No. 3,338,319 to P. H. Griffin, III, patented Aug. 29, 1967, an apparatus for maintaining balanced mud circulation to prevent blowouts is shown. A mud level sensing device is actuated by a float on the mud level in the tank and serves to control, as through an operative connection, at throttling valve which is provided in the mud return line.

In U.S. Pat. No. 3,086,397 to Ray E. Hudson, patented Apr. 23, 1963, a pneumatic device for determining the level of liquid or the volume of liquid present in a plurality of tanks of different cross-sectional area is provided. A liquid volume indicator for a plurality of tanks comprises a plurality of metering means, each being a metering means for determining liquid level of one of said pluralities of tanks, plurality of converting means each being a converting means for producing a differential gas pressure from a source of pressurized gas proportional to the liquid level of each tank as determined by the measuring means, and an indication of gas pressure differences, all the converting means connected in series with each other and with the indicator so that the indicator indicates the sum of the pressure differences obtained by all the converting means.

SUMMARY OF THE INVENTION

The present invention provides an improved system for measuring the level of material within a container and in a preferred embodiment the mud level of drilling mud in a mud pit. Detector means are positioned above the material for measuring the level of the material in the container. A shroud is positioned around the detector means. A shroud includes means for allowing circulation of ambient air. The above and other features and advantages of the present invention will become apparent from a consideration of the following detailed description of the invention when taken in conjunction with the accompanying drawings.

BRIEF DESCRIPTION OF THE DRAWINGS

FIG. 1 is an illustration of a device constructed in accordance with the invention in position for measuring the level of drilling mud in a mud pit.

FIG. 2 is an enlarged and exploded view of a portion of the equipment shown in FIG. 1.

FIG. 3 is an diagrammatic illustration of the equipment shown in FIG. 2 in operation for measuring the level of drilling mud in a mud pit.

DETAILED DESCRIPTION OF THE INVENTION

The present invention provides a reliable ambient temperature environment for the transducer used for measuring the level of material in a container. The present invention also provides isolation from hail, sleet, snow or other weather conditions that could induce error signals to the transducer. The present invention provides protection to the transducer during transit, assembly and operation. In addition, the present invention provides extraneous energy shielding for sonic type transducers.

Referring now to the drawings and in particular to FIG. 1, an embodiment of the present invention is shown located in position above the drilling mud in a mud pit. During the drilling of an oil or gas well, a wellbore extends downward into the earth. A drill bit is attached to the lower end of a rotary drill string. In normal circumstances drilling mud is circulated downwardly in the interior of the drill string out through the drill bit and upward in the annulus between the outer periphery of the drill string and the walls of the earth borehole. The drilling mud returns to the earth's surface and is channeled through an outlet pipe into a mud storage pit. There may be one or more mud pits as desired and the present invention is operable with one or more such pits. The drilling mud is stored in the mud pit until removed therefrom and returned to the drill string for recirculation down the drill string as previously described.

An indication of a pending blowout may be obtained by monitoring for an increase in mud level in the mud pits. During the drilling operation gas from the formations can enter the wellbore. The introduction of gas bubbles into the wellbore causes a corresponding volumetric displacement of drill mud into the mud pits by forcing it out of the earth borehole. This of course causes an increase in the volume of the mud pit which can be determined by an increase in the mud level. The initial displacement of mud can be quite small in terms of the volume of mud present since the pressure at the bottom of the wellbore is very high and the gas bubbles will initially be quite compressed. However, as the bubbles rise toward the surface of the well, they increase in volume because the pressure on the bubbles decreases as the bubbles progress towards the surface of the earth. As the gas bubbles progress upwardly they will expand and if allowed to do so will displace larger and larger volumes of mud into the mud pits. If such an increase in the mud level can be detected promptly, suitable action can be taken in accordance with procedures well known in the art. The present invention provides a system for accurately and continuously monitoring the level of mud in the mud pits.

As shown in FIG. 1, a mud level monitoring system generally designated by the reference numeral 10 is shown in position in a mud pit 12. The mud pit contains a volume of drilling mud 14 having a certain mud level 16. As is normal in a system for drilling oil and gas wells, pipes 18 extend across the mud pit 12. A transducer unit 20 is monted upon one of the pipes 18. The transducer in the present embodiment is an ultrasonic transducer that utilizes sonic energy. A high energy electrical pulse is sent to a sensor within the transducer unit 20 which converts it to an acoustical signal. The sound waves are directed in a very narrow beam toward the mud level 16. The sound waves are reflected back to the sensor which converts the energy into an electrical impulse. The return signal is analyzed and a voltage is generated which is proportional to the distance between the sensor and the mud level. The voltage or current is then directed to a display meter, counter, recorder or alarm system well known in the art. The interface between the drilling mud 14 and the air above the mud 14 is well defined and is a good target for the ultrasonic measurements.

The ultrasonic sensor within transducer 20 contains a special temperature compensation circuit. The speed of sound varies approximately 1.5 percent for each 10 degree centigrade change in temperature. Stated another way, the speed of sound changes with temperature at the rate of one foot per second per degree Fahrenheit. At 70° the speed of sound is 1,130 feet per second. A 50° F. temperature change would therefore create a 4.2 percent error without providing some means for measuring the ambient temperature and providing a suitable correction. With the transducer unit 20 positioned above the mud pit 12 it is important to be able to provide a temperature measurement indicative of the temperature of the air between the drilling mud 14 and the transducer unit 20. A transducer positioned in the open sun and/or a transducer that is enclosed by any type of protective housing would produce inaccurate temperature compensation because heat would build-up and the temperature at the transducer would not be indicative of the temperature of the ambient air between the mud level 16 and the transducer unit 20. The present invention provides air flow from the mud pit level past the transducer by convection thereby insuring that the temperature sensed at the transducer unit 20 is representative of the air column between the mud level 16 and the transducer unit 20.

Referring now to FIG. 2, an exploded view of the mud level monitoring system 10 shown in FIG. 1 is illustrated. The mud level monitoring system comprises the transducer unit 20. The transducer unit 20 includes a cylindrical metal shroud 22 open at the bottom having a top 24 connected to an appropriate means for attaching the system above the mud pit. The shroud 22 is fabricated of heavy gage metal. The top 24 is welded to a conduit elbow 26. The conduit elbow is in turn connected to a pipe above the mud pit. The sensor unit 28 is adapted to fit within the cylindrical metal shroud 22. The sensor unit 28 screws into the elbow 26 and is substantially surrounded by the shroud 22. The neck 30 of the sensor unit 28 contains suitable threads 32 for threading into the conduit elbow 26. The neck 26 includes a dampening material which by its nature is sensitive to breakage. The sensor unit 28 is commercially available, for example, it may be a sensor unit such as a series SLM or FM model transducer including temperature compensation manufactured and marketed by Wesmar Industrial Systems Division, 905 Dexter Avenue North, Seattle, Wash.

A series of vent holes 34 are positioned around the upper portion of the shroud 22. This allows for convection of ambient air between the sensor unit 28 and the side walls of the shroud 22. A chimney effect is produced that causes the flow of air from the surface level 16 of the drilling mud 14 past the sensor unit 28 thereby insuring that the temperature being sensed by the sensor unit 28 is representative of the ambient air between the mud level 16 and the transducer unit 20.

Means are provided for limiting the lateral movement of the sensor unit 28 within the shroud 22. The neck 30 includes a dampening material positioned between the sensor unit 28 and the top 24 of the shroud 22. The means for preventing lateral movement of the sensor unit 28 helps prevent this neck 30 from being cracked. A series of Nylon brace screws 36 are threaded through small holes 38 near the lower end of the shroud 22. The three screws 36 are positioned 120 degrees apart. They limit the lateral movement of the sensor unit 28 in the shroud 22 resulting from the transducer unit 20 being dropped or being struck by other equipment. The screws 36 do not actually contact the sensor unit 28 but are in close proximity thereto. This substantially prevents lateral movement insuring that the neck 30 will not be cracked.

Referring now to FIG. 3, a schematic illustration of the transducer unit 20 in operation sensing the level 16 of mud 14 in the mud pit is shown. Under normal conditions the sun rays would heat up the sensor unit 28 and any housing positioned around it. It would be heated to a temperature higher than the ambient temperature of the air between the mud level 16 and the transducer unit 20. This would result in inaccurate readings because the temperature compensation would be based upon the elevated temperature at the transducer unit 20 rather than the true temperature of the ambient air between the transducer unit 20 and the mud level 16. In the present invention, the column of air 40 between the mud level 16 and the transducer unit 20 tends to circulate upward through the vent holes 34 and out. Accordingly, the column of air 40 between the transducer unit 20 and the mud level 16 is continually circulated past the sensor unit 28 insuring that the temperature at the transducer unit 20 is substantially the same temperature as the air 40 between the transducer unit 20 and the mud level. As heat from the sun rays is generated at the shroud 22, the air around the shroud is heated and becomes lighter. The air circulates out through the vent holes 34 creating a chimney effect.

The transducer unit 20 generates sound waves 44 which are reflected back by the mud level 16 and sensed at the sensor unit 28 thereby providing an accurate and continuous measurement of the mud level 16. The temperature sensor 42 within the sensor unit 28 constantly provides a correction due to changes in temperature and the temperature correction is accurately based upon the ambient air temperature through which the sound waves 44 travel.

The embodiments of the invention in which an exclusive property or privilege is claimed are defined as follows:

1. An apparatus for measuring the level of drilling mud in a mud pit, wherein ambient air is above the drilling mud, comprising:
   a detector positioned above said drilling mud for directing energy through the ambient air between said detector and said drilling mud and receiving returned energy from said drilling mud,
   said detector including means for sensing temperature,
   an annular shroud located above said drilling mud and positioned around said detector, and
   means for promoting and allowing ambient air to circulate upward from said drilling mud through said shroud thereby insuring that said means for sensing temperature is sensing temperature of said ambient air.

2. The apparatus of claim 1 wherein said means for promoting and allowing said ambient air to circulate upward from said drilling mud through said shroud consists of a number of holes positioned in the upper portion of said shroud.

3. The apparatus of claim 2 including means for maintaining the shroud in position above said drilling mud and around said detector without interfering with the operation of said detector or the ambient air circulating through said shroud.

4. The apparatus of claim 3 wherein said means for maintaining said shroud in position consists of a multiplicity of screws extending through the lower portion of said shroud that extend close to said detector without actually contacting said detector.

5. The apparatus of claim 4 wherein said multiplicity of screws include at least three screws.

6. An apparatus for measuring the level of drilling mud in a mud pit, wherein ambient air is above the drilling mud, comprising:
   a transducer for directing sonic energy through the ambient air between said transducer and said drilling mud and receiving returned energy from said drilling mud,
   said transducer including temperature correction means,
   an annular shroud located above said drilling mud and positioned around said transducer, said shroud being open at the bottom, and
   flow means including at least one vent hole extending through said shroud for promoting and allowing the ambient air between said drilling mud and said transducer to circulate upward from said drilling mud through said shroud thereby insuring that the temperature correction means is exposed to said ambient air.

* * * * *